(12) United States Patent
Bohm et al.

(10) Patent No.: US 7,107,821 B2
(45) Date of Patent: Sep. 19, 2006

(54) LEAK INDICATOR WITH TEST LEAK AND TEST LEAK FOR INTEGRATION INTO A LEAK INDICATOR

(75) Inventors: Thomas Bohm, Cologne (DE); Werner Grobe Bley, Bonn (DE); Randolf Rolff, Kerpen-Horrem (DE)

(73) Assignee: Inficon GmbH, (DE)

( * ) Notice: Subject to any disclaimer, the term of this patent is extended or adjusted under 35 U.S.C. 154(b) by 25 days.

(21) Appl. No.: 10/471,925

(22) PCT Filed: Apr. 11, 2001

(86) PCT No.: PCT/EP02/02845

§ 371 (c)(1),
(2), (4) Date: Mar. 3, 2004

(87) PCT Pub. No.: WO02/084246

PCT Pub. Date: Oct. 24, 2002

(65) Prior Publication Data

US 2004/0139787 A1    Jul. 22, 2004

(30) Foreign Application Priority Data

Apr. 11, 2001   (DE) ................ 101 18 085

(51) Int. Cl.
*G01M 3/20* (2006.01)
(52) U.S. Cl. .......................... 73/40.7; 73/40
(58) Field of Classification Search ............... 73/40.7, 73/40
See application file for complete search history.

(56) References Cited

U.S. PATENT DOCUMENTS

| | | | | |
|---|---|---|---|---|
| 2,947,166 A | * | 8/1960 | Palmer et al. | 73/40.7 |
| 2,979,937 A | | 4/1961 | Chausson | |
| 2,981,091 A | * | 4/1961 | Roberts | 73/40.7 |
| 3,027,753 A | * | 4/1962 | Harder | 73/40.7 |
| 3,486,365 A | * | 12/1969 | Briggs | 73/40.7 |
| 3,786,675 A | * | 1/1974 | Delatorre et al. | 73/25.03 |
| 4,016,743 A | * | 4/1977 | Henderson et al. | 73/1.04 |
| 5,010,761 A | * | 4/1991 | Cohen et al. | 73/40.7 |
| 5,767,391 A | * | 6/1998 | Wong | 73/40.7 |
| 5,777,203 A | | 7/1998 | Stymne | |
| 5,889,199 A | | 3/1999 | Wong et al. | |
| 5,907,092 A | * | 5/1999 | Bohm | 73/40.7 |
| 6,189,369 B1 | * | 2/2001 | Yokogi | 73/40.7 |
| 6,550,313 B1 | * | 4/2003 | Flosbach | 73/40.7 |

FOREIGN PATENT DOCUMENTS

| | | |
|---|---|---|
| DE | 29 26 112 | 1/1981 |
| DE | 691 03 925 | 2/1995 |
| DE | 44 45 829 | 6/1996 |
| DE | 199 03 097 | 8/2000 |
| EP | 0 444 434 | 9/1991 |
| FR | 2 767 197 | 12/1991 |

* cited by examiner

*Primary Examiner*—Michael Cygan
(74) *Attorney, Agent, or Firm*—Peter J. Bilinski

(57) ABSTRACT

A leak indicator including a housing that houses components of the indicator as well as a test leak, and test leaks that are suitable for integration into a leak indicator.

14 Claims, 1 Drawing Sheet

LEAK INDICATOR WITH TEST LEAK AND TEST LEAK FOR INTEGRATION INTO A LEAK INDICATOR

FIELD OF THE INVENTION

The present invention relates to a leak indicator having the characteristics of patent claim 1 as well as a test leak having the characteristics of patent claim 11 suitable for integration into a leak indicator.

BACKGROUND OF THE INVENTION

Stringent requirements as to leaktightness are imposed on many systems and products in industry and research. It depends on the type of leak, leak rate or the size of the leak which leak searching method is applied, respectively, which leak indicator is employed.

In the instance of units under test or subassemblies manufactured in the refrigerants, automotive or other industries, the method of sniffer leak detection is frequently employed. This requires, that there be present in the unit under test or subassembly a test gas, preferably at an overpressure. Frequently helium is employed as the test gas, which is introduced before sealing into the hollow spaces which are to be analysed for the presence of leaks. It is also known to employ gases present anyway in the units under test or subassemblies as the test gas, for example SF6 or halogen gases in the refrigerants industry.

The unit under test which is to be analysed for the presence of leaks is scanned with the aid of the intake point (tip) of a sniffer gun, whereby said tip accepts the test gas escaping from a possibly present leak and supplies it to a test gas detector. This test gas detector may be accommodated together with other components within an instrument to which the sniffer gun is linked, among other things, through a hose. If the detector is sufficiently small (for example, an infrared gas analyser) then it also may be accommodated in the gun itself, thereby significantly reducing the response time.

Test gas leak indicators need to be calibrated frequently. To this end it is known to employ test leaks exhibiting a defined leakage. Test leaks for these purposes comprise a gas reservoir and a constriction of known conductance. To calibrate a leak indicator with a sniffer gun, the sniffer tip is brought in to the vicinity of the constriction, and the leak rate indication is adjusted.

Test leaks should exhibit, over a time which is as long as possible (significantly over one year), a constant gas flow and should be, moreover, so small that they can be accommodated within the housing of a leak indicator. This requires that the test gas be present in the test leak at a high pressure (8 bar and more). Test leaks of this kind are temperature sensitive. This applies in particular when the test gas is in the liquid state at the pressures stated. For safety reasons, a maximum temperature must not be exceeded. Installing a test leak of this kind within a leak indicator in which heat generating components are present, causes problems.

SUMMARY OF THE INVENTION

It is the task of the present invention to install the test leak in such a manner within the housing of a leak indicator that the risk of exceeding maximum permissible temperatures does not exist, and/or to design the test leak itself such that even in the instance of exceeding permissible temperatures a hazard to the users of the leak indicator will not exist.

According to the present invention, the partial task of safely installing the test leak within the housing of a leak indicator is solved. Through these means it is achieved that the test leak can not attain higher temperatures compared to the ambient temperature. The maximum temperature of the test leak is then at the same time the maximum permissible operating temperature for the leak indicator itself.

The further partial task affecting the design of the test leak is also solved according to the invention. Through the outer housing it is ensured that even when exceeding the maximum permissible temperatures for the pressurised vessel, a hazard to persons present in the vicinity of the test leak is excluded.

BRIEF DESCRIPTION OF THE DRAWINGS

Further advantages and details of the present invention shall be explained with reference to the examples of embodiments depicted schematically in drawing FIGS. 1 and 2.

DETAILED DESCRIPTION

Figure 1:
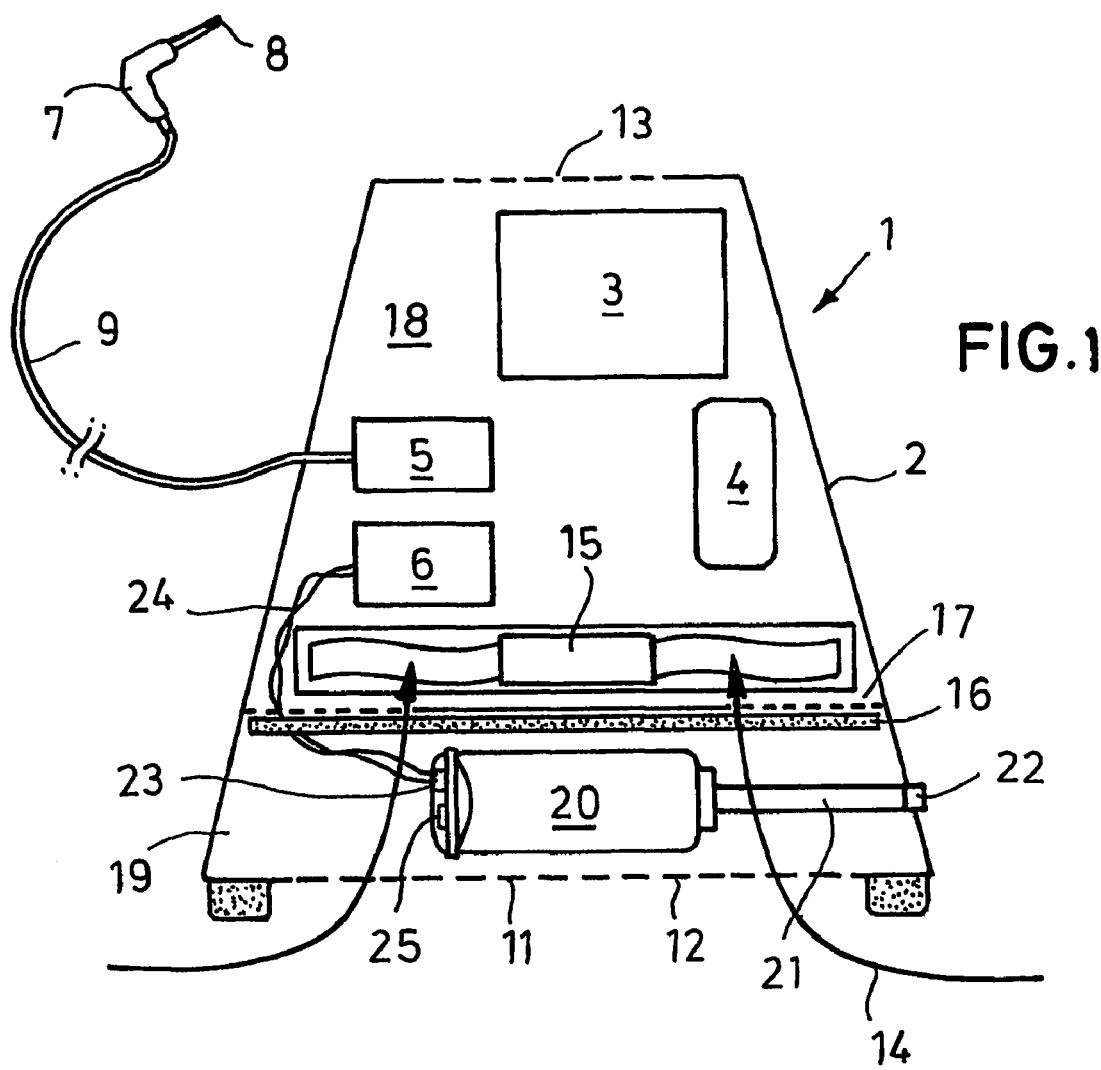
FIG. 1 illustrates a sniffer leak indicator according to the present invention with components contained therein and FIG. 2 is a sectional view through a test leak in accordance with the present invention.

The leak indicator 1 depicted in drawing FIG. 1 comprises a housing 2 in which the instrument components are accommodated. Presented by way of blocks are, for example, a vacuum pump 3, a power supply 4, the gas detector 5 and a control unit 6. Located outside of the housing is the sniffer gun 7 with its intake point (tip) 8. It is linked via a hose 9 to the gas detector 5. In the instance of the gas detector 5 being accommodated within the sniffer gun 7, it is linked to the control unit via signal lines.

All instrument components are accommodated in the upper section of the housing 2. The housing 2 itself is equipped in the area of the bottom 11 and in the upper area with cooling air inlets 12 respectively air slots 13. Since at least some of the instrument components generate heat, a cooling air flow (arrows 14) is produced through the rising air alone. Should this flow not suffice, an additional fan 15 may be provided supporting the flow of cooling air. In the depicted example of an embodiment, said fan is located beneath the instrument components. With 16 a filter mat is designated through which the taken in cooling air is cleaned. Located above the filter mat 16 is a separating plane 17 equipped with air penetration openings, said separating plane limiting towards the bottom the partial space 18 within the housing with the instrument components 3 to 6.

With 20 the test leak is designated which is accommodated within the leak indicator 1. Said test leak is located below the separating plane 17, so that it is located within an insulated partial section 19 of the housing being thermally separated from partial section 18 of the housing. Fresh cooling air continuously flows around said test leak. The separating plane 17, directly above the test leak 20 does not exhibit any penetration openings, as well as the filter mat 16 support the thermal insulation of the partial section 19 of the housing from the partial section 18. The test leak 20 may attain at most the temperature of the ambient air.

The test leak 20 has a pipe connection 21 which penetrates the housing 2 towards the outside. The pipe connection 21 forms a commonly continuously open connection between the constriction of the leak indicator 20, said constriction not being depicted in drawing FIG. 1, and an opening 22 suited for introducing the sniffer tip 7. This arrangement allows to calibrate the leak rate readout at any time.

It is especially expedient to equip a test leak 20 suited for installation within a leak indicator 1 with a gas reservoir 31 and a constriction 33,—for example, in the vicinity of its constriction—with a temperature sensor 23, said temperature sensor being linked (lines 24) to the control unit 6. These measures allow to take into account the temperature dependent penetrability of the constriction of the test leak 20 when calibrating the leak rate readout. In particular, in the instance of test leaks with a diaphragm as the constriction, taking into account the above is of significance, since the penetrability of the diaphragm is exponentially temperature dependent.

Now in order to attain a reliable calibration of the leak indicator, the temperature dependence of the test leak is compensated through a correction curve embedded in the software of the instrument (control unit 6). The temperature is measured in the area of the test leak. For this purpose there is located at the bottom of the test leak a printed circuit board with the temperature sensor and an EEPROM. In drawing FIG. 1 the EEPROM is depicted schematically and designated as 25.

The advantage of the concept detailed, is thus that a compact test leak for integration into small benchtop units can be produced in a cost-effective manner. Since in the EEPROM production date, filling quantity as well as leak rate are saved, it is possible to estimate the point of time at which the reservoir has emptied itself and thus the test leak must be exchanged.

Figure 2:
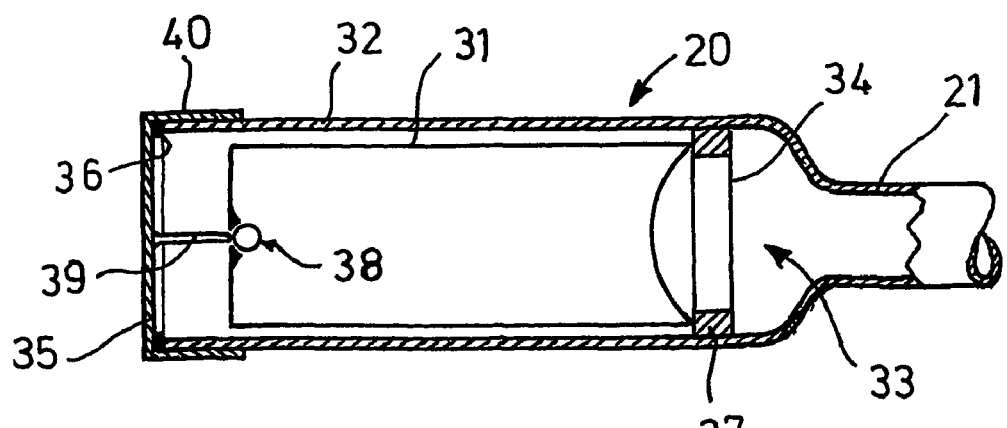

Drawing FIG. 2 depicts an especially well-suited test leak 20 for installation into a leak indicator in accordance with drawing FIG. 1. Said test leak comprises an inner pressure vessel 31 with the gas reservoir. This is a commercially available pressure cell which contains the desired test gas in the liquid state. The pressure in filled cartridges of this kind is severely temperature dependent. Commonly it must not exceed 8 bar (test pressure 12 bar). The maximum temperature to which pressure cells of this kind may commonly be exposed is limited to 50° C.

In spite of this, in order to be able to employ pressure vessels of this kind also at times at higher ambient temperatures as a gas reservoir for test leaks, a second outer housing 32 is provided. It consists, for example, of steel and is rated for significantly higher pressures than 8 (respectively 12) bar. In the area of one face side it exhibits the constriction 33 being designed by way of a diaphragm 34. There then follows the pipe connection 21 already detailed in connection with drawing FIG. 1. In the area of the other face side there is provided a releasable cap 35 which preferably may be unscrewed. It allows to close the releasable housing 32 in a sealed manner. Located between its face side opening and the cap 35 is a sealing ring 36. After detaching the cap 35, the inside of the housing 32 is accessible for inserting or removing the pressure vessel 31.

In the area of the face side opposing the cap 35, the housing 32 is equipped with a flange 37 projecting towards the inside. This flange carries on its side facing the pipe connection 21, the diaphragm 34. On the side of the flange 37 facing the cap 35, the pressure vessel 31, inserted into the housing 32, is supported.

In the example of the embodiment depicted in drawing FIG. 2, the pressure vessel 31 is equipped with a ball valve 38 being located in one of its face sides. The pressure vessel 31 is inserted in such a manner into the housing 32 that the valve 38 faces the cap 35. The cap 35 is equipped with a pin 39 assigned to the valve 38, the length of said pin being so selected that it opens the valve 38 when the cap 35 is completely screwed on. When employing a pressure vessel without valve 38, there is provided at the location of the pin 39 a spike which provides the pressure vessel 31 with an opening upon closing the cap 35. After closing the cap, either the valve 38 is open or the opening provided by the spike is present, so that the test gas may flow into the housing 32. Crucial to the magnitude of the temperature load is now no longer the pressure vessel 31, but the housing 32 instead.

If it is required to replace the pressure vessel 31, the housing 32 is opened by unscrewing the cap 35. The rim of the cap is provided in the vicinity of its upper side with a small bore 40. This allows, before finally unscrewing the cap 35, the pressure to be equalised between the inside of the housing 32 and the surroundings.

The special advantage of the test leak in accordance with the present invention is such that the pressure resistant housing 32 will not have to be replaced. With respect to its stability it may be rated according to the desired requirements. Only during transportation and maintaining the pressure vessel 31 in stock, need the relatively low ambient temperatures be taken into account. Also the constriction (diaphragm 34) does not belong to a non-reusable product. This offers the advantage that when changing the gas reservoir, the leak rate of the test leak does not change.

In addition, the test leak is optimally protected when being installed according to the present invention within a leak indicator. Also the guidance of the cooling air for the instrument over the test leak ensures as the maximum temperature, the ambient temperature in the area of the test leak.

The invention claimed is:

1. Leak indicator comprising a housing which houses components of the indicator and a test leak, wherein the test leak is located below the instrument components and in which cooling air flows through the housing from the bottom to the top wherein for the purpose of supporting the cooling air flow, a fan is provided wherein a separating wall in the housing is provided, said wall being equipped with penetration openings, which separates an upper partial section of the housing from a lower partial section of the housing including a filter mat located in the area of the separating wall.

2. Equipment according to claim 1, wherein there are located within the upper partial section of the housing instrument components, and where the test leak is located in the bottom partial section of the housing.

3. Equipment according to claim 1, including a constriction of the test leak that is a diaphragm.

4. Equipment according to claim 1, including a temperature sensor assigned to the test leak, said sensor being linked to a control unit.

5. Equipment according to claim 1, wherein said equipment is designed as a sniffer leak indicator and in which a sniffer gun is linked to instrument components accommodated in the housing.

6. Equipment according to claim 5, wherein the test gas detector is accommodated within the sniffer gun.

7. Leak indicator comprising a housing which houses components of the indicator and a test leak, wherein the test leak is located below the instrument components and in which cooling air flows through the housing from the bottom to the top wherein said equipment is designed as a sniffer leak indicator and in which a sniffer gun is linked to instrument components accommodated in the housing wherein the test leak is equipped with a pipe connection projecting through the housing to the outside and having an opening suited for introducing the intake point of the sniffer gun.

8. Equipment according to claim 7, wherein for the purpose of supporting the cooling air flow, a fan is provided.

9. Equipment according to claim 7, wherein a separating wall in the housing is provided, said wall being equipped with penetration openings, which separates an upper partial section of the housing from a lower partial section of the housing.

10. Equipment according to claim 9, wherein there are located within the tipper partial section of the housing instrument components, and where the test leak is located in the bottom partial section of the housing.

11. Equipment according to claim 9, including a filter mat located in the area of the separating wall.

12. Equipment according to claim 7, including a constriction of the test leak that is a diaphragm.

13. Equipment according to claim 7, including a temperature sensor assigned to the test leak, said sensor being linked to a control unit.

14. Equipment according to claim 7, wherein the test gas detector is accommodated within the sniffer gun.

* * * * *

UNITED STATES PATENT AND TRADEMARK OFFICE
CERTIFICATE OF CORRECTION

| | | |
|---|---|---|
| PATENT NO. | : 7,107,821 B2 | |
| APPLICATION NO. | : 10/471925 | |
| DATED | : September 16, 2006 | |
| INVENTOR(S) | : Thomas Bohm et al. | |

It is certified that error appears in the above-identified patent and that said Letters Patent is hereby corrected as shown below:

Claim 10, Column 5, Line 12. Please delete "the tipper partial" and replace with --the upper partial--.

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO.         : 7,107,821 B2  
APPLICATION NO.    : 10/471925  
DATED              : September 19, 2006  
INVENTOR(S)        : Thomas Bohm et al.

It is certified that error appears in the above-identified patent and that said Letters Patent is hereby corrected as shown below:

Claim 10, Column 5, Line 12. Please delete "the tipper partial" and replace with --the upper partial--.

This certificate supersedes Certificate of Correction issued December 5, 2006.

Signed and Sealed this

Second Day of January, 2007

JON W. DUDAS  
*Director of the United States Patent and Trademark Office*